United States Patent
Fernandes et al.

(10) Patent No.: US 7,149,298 B2
(45) Date of Patent: Dec. 12, 2006

(54) METHOD AND SYSTEM FOR PROVIDING SUBGROUP CONVERSATION DURING A TELECONFERENCE

(75) Inventors: Lilian Sylvia Fernandes, Austin, TX (US); Vinit Jain, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 10/865,701

(22) Filed: Jun. 10, 2004

(65) Prior Publication Data

US 2005/0276405 A1    Dec. 15, 2005

(51) Int. Cl.
*H04M 3/42* (2006.01)
(52) U.S. Cl. .................................. 379/202.01; 713/168
(58) Field of Classification Search ........... 379/202.01, 379/713, 168
See application file for complete search history.

(56) References Cited

U.S. PATENT DOCUMENTS

| 5,483,588 A * | 1/1996 | Eaton et al. ............ 379/202.01 |
| 2002/0029350 A1* | 3/2002 | Cooper et al. ............... 713/200 |
| 2003/0070072 A1* | 4/2003 | Nassiri ........................ 713/168 |
| 2005/0265534 A1* | 12/2005 | White .................... 379/202.01 |

\* cited by examiner

*Primary Examiner*—Creighton Smith
(74) *Attorney, Agent, or Firm*—Mitch Harris, Atty at Law, LLC; Andrew M. Harris; Casimer K. Salys

(57) ABSTRACT

A method and system for providing subgroup conversation during a teleconference enables side conversations during a virtual meeting. A passcode is used by parties to join the subgroup conversation, so that privacy of the subgroup is maintained. Alternatively, an administrator may set up subgroups and either join or invite members, who may toggle between the main teleconference and a subgroup teleconference using a standardized user input. The system may be implemented in any telephone network and across telephone networks such as public switched telephone networks (PSTNs), wireless networks, voice over Internet protocol networks and/or private branch exchanges (PBXs).

12 Claims, 3 Drawing Sheets

_(12)_ United States Patent US 7,149,298 B2

METHOD AND SYSTEM FOR PROVIDING SUBGROUP CONVERSATION DURING A TELECONFERENCE

BACKGROUND OF THE INVENTION

1. Field of the Invention

The present invention is related to telephone communication systems and devices, and more particularly a teleconferencing system that enables conversation between subgroups of a teleconference.

2. Description of Related Art

Teleconferencing systems are presently in widespread use in both private and public telephone systems, including wireless telephone systems. Such systems range from three-way calling services available to most residential and business telephone connection points to large-scale conferencing systems to which parties must dial in, be connected by administrators or are conducted on private branch exchanges (PBXs) for use within a building or business network.

While teleconferencing as it exists today provides a powerful service in that meetings can be conducted virtually rather than requiring a physical gathering, there are disadvantages to a typical teleconference in that side conversations are not enabled and therefore must typically be postponed until after the teleconference is over, or two or more parties must leave the teleconference and establish another communication unless they are in the same physical location.

Security is also critical in some teleconferences, as business and legal interests may be at stake. Therefore, existing teleconferencing systems that are accessible via the public telephone networks often provide verification of the identity of conferencing parties before establishing a connection between them.

Therefore, it would be desirable to provide a method and system for providing side conversations during a teleconference. It would further be desirable to provide a mechanism for providing security to ensure that the side conversations are not heard by parties to the main teleconference and so that unauthorized others are not able to hear or participate in the side conversations.

SUMMARY OF THE INVENTION

The above objectives of providing a mechanism for secure side conversation within a teleconference are achieved in a method and system for providing subgroup conversation during a teleconference.

The method and system receive a user input from a party to the teleconference and determine from the user input whether or not the party should be connected to a subgroup conversation. If the determination is that the party should be connected to the subgroup conversation, then the party is joined to the subgroup conversation. The user input may be a passcode that provides security by limiting the access to the subgroup. Alternatively, the user input may be only a join command and the determination of whether or not the party should be connected is made on the basis of whether the particular terminal device used by the party is associated with the subgroup (i.e., whether the party is a member of the subgroup). As another alternative, a digital certificate or other security identifier may be supplied from the terminal device in response to the "join" user input.

The teleconferencing mechanism may be a public switched telephone network (PSTN), a wireless telephone network, a private branch exchange (PBX), voice over Internet network, other suitable telephone network or any combination of telephone networks that can teleconference users of the network(s).

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

The present invention concerns an added feature to existing teleconferencing systems: the ability to provide side conversations through the management of subgroups of parties to a teleconference. One of two mechanisms is employed to control the security of the subgroup: fixed membership and access control. With fixed membership, the terminal devices (stations—either telephones or other voice communications equipment such as voice over Internet protocol—enabled computers) are associated with a subgroup, identifying the users of the particular stations in the subgroup as members by association with the stations. Alternatively, or in concert, a passcode may be used to verify that the user is authorized to join in the subgroup conversation (access control). For example, a teleconference participant who wishes to join a subgroup side conversation may press "7-4-2-2-3" on the numeric keypad and gain entry to a particular subgroup conversation. The particular subgroup conversation is both identified and secured by the passcode.

Figure 1:
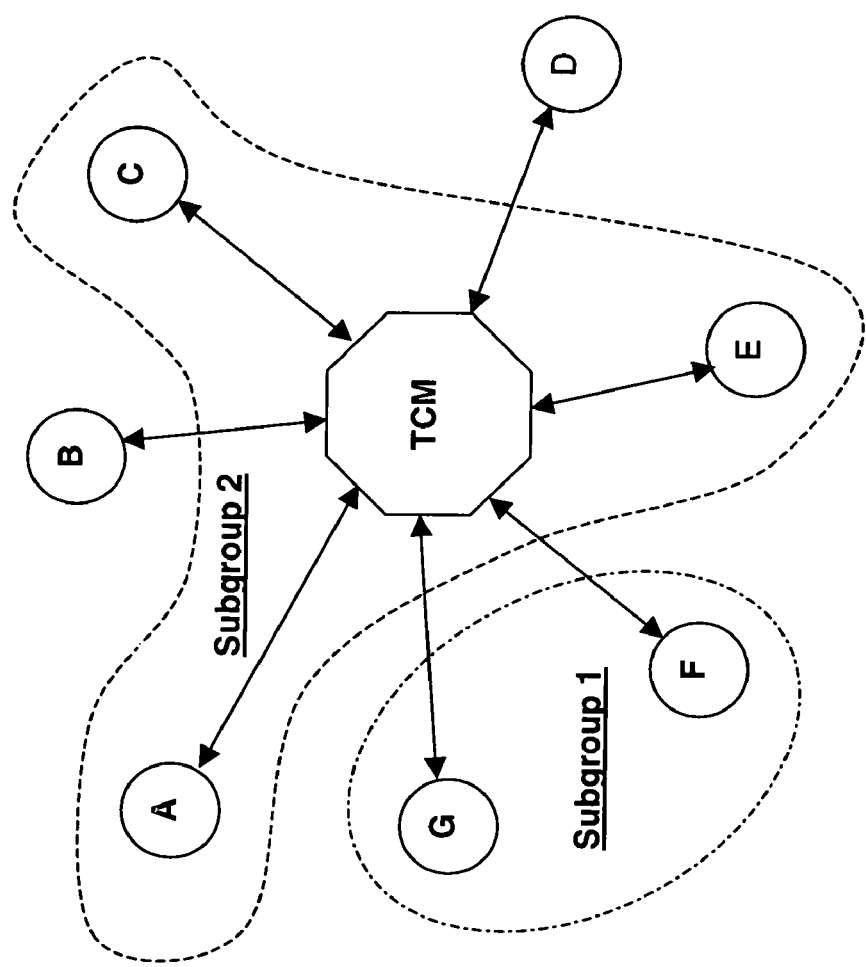
FIG. 1 is a pictorial diagram illustrating a telephone system operated in accordance with an embodiment of the present invention.

Referring to the figures, and particularly to FIG. 1, a telephone network in accordance with an embodiment of the invention is depicted. It should be understood that a telephone network in the context of the present invention may span many physical telephone networks and types, as long as voice communications and control of voice connections are bridged between the physical networks. Participants A–G are joined in a teleconference, which may be established by any method suitable for teleconferencing. For example, dial-in teleconferencing where a central number is provided for a teleconference scheduled with a teleconferencing service may be accessed from any telephone network and may be accessed by any user that meets the security criteria for the teleconference. The management of the illustrated teleconference is performed by teleconference manager TCM. During the teleconference, participants F and G desire to have a side conversation to discuss a matter outside of the hearing of participants A–E, but wish to return to the teleconference. Therefore, the present invention provides a methodology and mechanism to establish a side conversation between participants F and G, who are now made members of Subgroup 1, and connected together on a private voice channel. Any number of participants can be added to a subgroup, and the first party to join a side conversation may be joined immediately, or may remain in the main teleconference until a second party joins. At another time, which may be during the side conversation of Subgroup 1, parties A, C and E also wish to have a side conversation and so the teleconference manager TCM establishes a private voice connection between parties A, C and E labeled Subgroup 2.

In general, Subgroup 1 and Subgroup 2 may be pre-established by TCM, or established by TCM in response to contact from one of the parties to TCM indicating the membership of the subgroup for the side conversation. Access to the side conversation is established in response to user input from one of participants A–G, which may take the form of an access code or a user input indicating that the user wishes to join a side conversation. The access code will generally identify the subgroup uniquely, but a separate subgroup identifier may be provide as the initial user input and a voice prompt for any security passcode required may be issued in response to the user input. Access to the side conversation may be automatic in response to the user input, while maintaining security of the side conversation. Security is achieved without passcode entry via identification of the terminal connecting the requesting party, either by knowing the terminal device identity, or by transmitting a device identity or digital certificate in response to the user input requesting entry to the side conversation.

Figure 2:
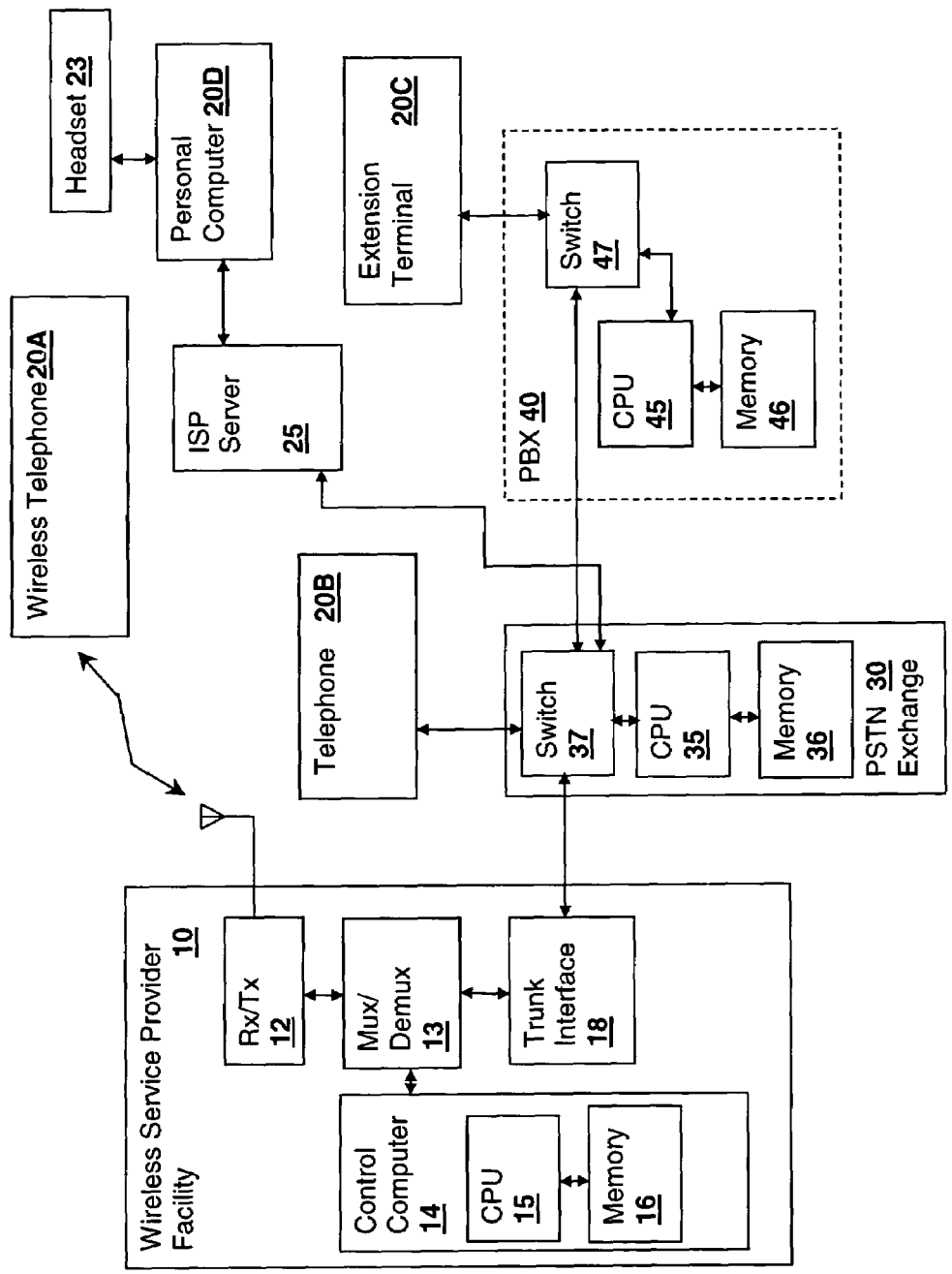
FIG. 2 is a block diagram of a telephone network in accordance with an embodiment of the present invention.

Referring now to FIG. 2, a telephone system in which the present invention is practiced is depicted. The system includes a wireless service provider facility 10 coupled to a wireless telephone 20A, a standard telephone 20B connected to a PSTN exchange 30, an extension terminal 20C connected to a PBX 20, and a personal computer 20D having a headset 23 for use with voice-over-Internet protocol communications and connected to an Internet Service Provider (ISP) server 25. The above units are not intended to be limiting, but are examples of the types of terminal devices and associated service provider equipment presently in use for telecommunications and in particular, telecommunications teleconferencing. Wireless service provider facility 10, PBX 40 and ISP Server 25 are all shown connected to PSTN exchange 30, which provides a common connection point. However, with the proliferation of digital telephone connection equipment, the above-listed service facilities may be connected centrally by a wireless provide facility or via an Internet or other digital network backplane.

Wireless service provider facility 10 includes receiver/transmitter 12, multiplexer/demultiplexer 13, control computer 14 having a processor 15 and memory 16 along with a trunk interface 18 for connection to PSTN exchange 30. Multiplexer/demultiplexer fulfils the function of the switch of the present invention, and for teleconferences between customers of the wireless service provider, control computer 14 may entirely manage teleconferencing including the features of the present invention and therefore includes program instructions for carrying out the methods of the present invention. PBX 40 also includes a processor 45 coupled to a memory 46 and a switch 47 for managing connections between extension terminals 20C and to PSTN exchange 30. ISP server 25 also includes processors and memory along with program instructions for carrying out teleconferencing methods of the present invention as between voice-over-Internet participants.

Similarly, PSTN exchange 20 includes a switch 37 controlled by a processor 35 coupled to a memory 36 that also contains program instructions for carrying out the methods of the present invention, and may in fact manage teleconferencing between the various types of terminal devices 20A–20D connected in the system, as PSTN exchange 30 provides the central connection point. However, as connected, any of the other service provider equipment could manage the teleconference of the present invention, as each has access to the public telephone network.

The program instructions that control each of the above exchanges include program instructions for setting up subgroups within a teleconference and connecting two or more participants from a main teleconference to a side conversation in response to user input from each party joining the side conversation.

Figure 3:
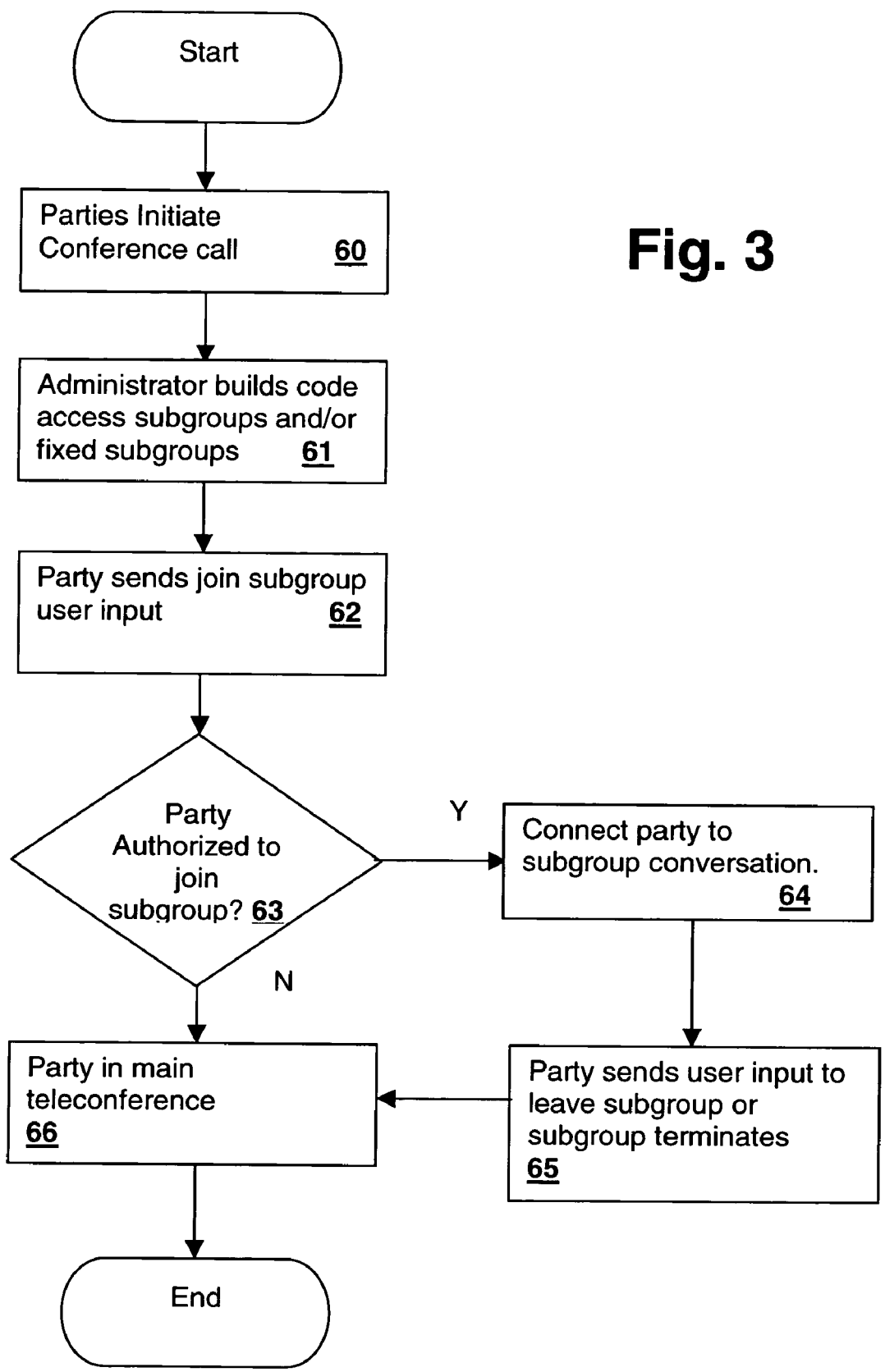
FIG. 3 is a flow chart of a method in accordance with an embodiment of the present invention.

Referring now to FIG. 3, a method in accordance with an embodiment of the present invention is depicted in a flowchart. The parties to the main teleconference establish the conference call (step 60) and the conference administrator builds code access subgroups and/or fixed (by terminal) access subgroups (step 61). One of the parties sends a "join subgroup" user input (step 62) and if the party is authorized to join the subgroup (decision 63), then the party is connected to the subgroup conversation (step 64). Until the party sends a user input to leave the subgroup or the subgroup terminates (step 65), the party remains in the subgroup conversation. If the party was not authorized to join the subgroup conversation, has left the subgroup conversation or the subgroup conversation has ended, the party is in the main teleconference conversation (step 66).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for providing a subgroup conversation during a teleconference, comprising:
   associating a set of members for said subgroup conversation with particular terminal devices that connect each of said set of members to said teleconference;
   receiving a user input from a party to the teleconference;
   decoding said user input to trigger transmission of a digital certificate;
   detecting whether an identity associated with the digital certificate is authorized for access to said subgroup conversation in order to determine whether or not to connect said party to said subgroup conversation; and
   responsive to determining that said party should be connected to said subgroup conversation, connecting said party to other parties to said subgroup conversation, whereby a private conversation is maintained between said party and said other parties that is private from yet other parties to said teleconference.

2. The method of claim 1, further comprising further responsive to determining that said party wishes to join said subgroup conversation, muting reception of said teleconference conversation from a telephone connection of said party.

3. The method of claim 1, further comprising setting up said set of members for said subgroup conversation, and wherein said decoding determines whether or not said user input is an input indicating that said party wishes to join said subgroup conversation, and wherein said detecting detects whether or not said party is one of said set of members, and wherein said connecting is performed only in response to determining that said party wishes to join said subgroup conversation and that said party is one of said set of members.

4. The method of claim 1, wherein said party is connected to said teleconference via a public telephone network, and wherein said connecting is performed by sending commands to network provider equipment managing said teleconference.

5. The method of claim 1, wherein said party is connected to said teleconference via a private branch exchange, and wherein said connecting is performed by sending commands to a private branch exchange controller.

6. The method of claim 1, wherein said party is connected to said teleconference via a voice-over-Internet connection, and wherein said connecting is performed by sending commands to a server managing said voice-over-Internet connection.

7. A teleconferencing control system for controlling teleconferences over a telephone network, said control system including a memory for storing program instructions and data for controlling said teleconferences, and a processor for executing said program instructions, and wherein said program instructions comprise program instructions for:

associating a set of members for said subgroup conversation with particular terminal devices that connect each of said set of members to said teleconference;

receiving a user input from a party to the teleconference;

decoding said user input to trigger transmission of a digital certificate;

detecting whether an identity associated with the digital certificate is authorized for access to said subgroup conversation in order to determine whether or not to connect said party to said subgroup conversation; and responsive to determining that said party should be connected to said subgroup conversation, connecting said party to other parties to said subgroup conversation, whereby a private conversation is maintained between said party and said other parties that is private from yet other parties to said teleconference.

8. The teleconferencing control system of claim 7, wherein said program instructions further comprise program instructions for: further responsive to determining that said party wishes to join said subgroup conversation, muting reception of said teleconference conversation from a telephone connection of said party.

9. The teleconferencing control system of claim 7, further comprising program instructions for setting up a set of members for said subgroup conversation, and wherein said program instructions for decoding determine whether or not said user input is an input indicating that said party wishes to join said subgroup conversation and wherein said program instructions for detecting detect whether or not said party is one of said set of members, and wherein said program instructions for connecting are executed only in response to determining that said party wishes to join said subgroup conversation and that said party is one of said set of members.

10. The teleconferencing control system of claim 7, wherein said party is connected to said teleconference via a public telephone network, and wherein said program instructions for connecting send commands to switching equipment managing said teleconference.

11. The teleconferencing control system of claim 7, wherein said party is connected to said teleconference via a private branch exchange, and wherein said program instructions for connecting send commands to a private branch exchange switching controller.

12. The teleconferencing control system of claim 7, wherein said party is connected to said teleconference via a voice-over-Internet connection, and wherein said program instructions for connecting send commands to a server managing said voice-over-Internet connection.

* * * * *